US006729073B2

(12) United States Patent
Nicolai

(10) Patent No.: US 6,729,073 B2
(45) Date of Patent: May 4, 2004

(54) CONNECTOR FOR ATTACHING A WINDOW PANEL TO A DRIVE ELEMENT OF WINDOW-LIFT DEVICE

(75) Inventor: Michael Nicolai, Grobkotzenburg (DE)

(73) Assignee: ArvinMeritor GmbH (DE)

( * ) Notice: Subject to any disclaimer, the term of this patent is extended or adjusted under 35 U.S.C. 154(b) by 0 days.

(21) Appl. No.: 09/927,032

(22) Filed: Aug. 9, 2001

(65) Prior Publication Data

US 2002/0017061 A1 Feb. 14, 2002

(30) Foreign Application Priority Data

Aug. 10, 2000 (DE) ........................................ 100 39 841

(51) Int. Cl.[7] .............................. B60J 1/17; E05F 11/38
(52) U.S. Cl. .............................. 49/375; 49/349; 49/372
(58) Field of Search .......................... 49/375, 358, 348, 49/349, 372; 52/716.5

(56) References Cited

U.S. PATENT DOCUMENTS

| | | | | | |
|---|---|---|---|---|---|
| 2,719,750 | A | * | 10/1955 | Orr | 49/385 |
| 4,051,632 | A | * | 10/1977 | Fukumoto et al. | 49/348 |
| 4,094,100 | A | * | 6/1978 | Fukumoto et al. | 49/348 |
| 4,449,326 | A | * | 5/1984 | Hori et al. | 49/375 |
| 4,706,412 | A | * | 11/1987 | Kobrehel | 49/352 |
| 4,762,904 | A | * | 8/1988 | Nakama | 428/122 |
| 4,910,917 | A | * | 3/1990 | Brauer | 49/348 |
| 4,991,351 | A | * | 2/1991 | Bertolini | 49/351 |
| 5,363,595 | A | | 11/1994 | Wirsing | |
| 5,515,651 | A | * | 5/1996 | Hofmann et al. | 49/375 |
| 5,729,930 | A | * | 3/1998 | Schust et al. | 49/375 |
| 5,778,599 | A | * | 7/1998 | Saito | 49/375 |
| 5,809,695 | A | * | 9/1998 | Strickland | 49/352 |
| 5,966,872 | A | * | 10/1999 | Wasek et al. | 49/375 |
| 5,992,099 | A | * | 11/1999 | Thomas | 49/375 |
| 6,119,403 | A | * | 9/2000 | Klippert et al. | 49/375 |
| 6,131,339 | A | * | 10/2000 | Ramus | 49/375 |
| 6,205,711 | B1 | * | 3/2001 | Klippert | 49/375 |
| 6,233,873 | B1 | * | 5/2001 | Lawrie et al. | 49/375 |
| 6,349,504 | B1 | * | 2/2002 | Schmitt | 49/375 |
| 6,418,668 | B1 | * | 7/2002 | Arquevaux | 49/348 |
| 6,425,207 | B1 | * | 7/2002 | Davis | 49/375 |
| 6,453,617 | B1 | * | 9/2002 | Klippert et al. | 49/375 |
| 6,460,296 | B1 | * | 10/2002 | Arquevaux | 49/375 |

FOREIGN PATENT DOCUMENTS

| | | |
|---|---|---|
| DE | 43 21 616 | 1/1995 |
| DE | 44 16 348 | 6/1995 |

* cited by examiner

*Primary Examiner*—Gregory J. Strimbu
(74) *Attorney, Agent, or Firm*—Carlson, Gaskey & Olds

(57) ABSTRACT

A window-lift device for motor vehicles includes a panel-connector, a drive-connector attached to a drive mechanism of the window-lift device for lifting and lowering a window pane, matching fixing pieces for fixing the panel-connector to the drive-connector, and an assembly piece. The assembly piece is mounted to the drive-connector and supports a first one of the fixing pieces in a pre-assembly position. The assembly piece and the drive-connector together provide a feeding opening for guiding the panel-connector to an aligning position in which the matching fixing pieces are to be engaged to fix the panel-connector to the drive-connector.

24 Claims, 6 Drawing Sheets

CONNECTOR FOR ATTACHING A WINDOW PANEL TO A DRIVE ELEMENT OF WINDOW-LIFT DEVICE

IN THE FIELD OF THE INVENTION

The invention concerns a window-lift device for motor vehicles with a connector means for attaching a window panel to a drive element.

Window-lift devices in motor vehicles are used in vehicle doors as well as for movable widow panels in fixed body parts of the motor vehicle.

IN THE BACKGROUND OF THE INVENTION

Window-lift devices for motor vehicles are commonly attached to a window regulator and other electrical or mechanical components of a door module The door module is then attached to a vehicle door. The door module is typically used as a division between a wet and dry space within the vehicle door. After the vehicle door and the door module are assembled, access to the wet space is limited. Therefore a worker typically cannot observe assembly of the window panel to the window drive element within the vehicle door. Further, the window panel may require adjustment with respect to the window opening or with respect to other vehicle body parts, like the B-column, after attachment of the window panel to the drive element. Adjustment of window panel position is complicated and hindered because a worker must make adjustments without directly viewing the connection between the window panel and the window drive element.

U.S. Pat. No. 6,119,403 discloses a connector for attaching a window panel to a drive element of a window-lift device. The connector includes a panel-connector and a drive-connector, both including matching connecting features providing connection of the panel-connector and the window panel to the drive-connector. The drive-connector is attached to a rail or other part of the window regulator. The panel-connector is pushed onto a lower edge region of the window panel using a U-shaped glass-channel. The drive-connector is connected to the guiding and lifting/lowering structure of the window regulator. Assembly of the window panel to the window regulator is accomplished by sliding the window panel through the window panel slit at a small angle with respect to a finally aligned window panel position. When the panel-connector abuts an upper connecting area of the drive connector, the window panel is tilted to an aligned position. The lower connecting features of the panel-connector and, the drive-connector snap together. This connecting method is possible without observation by the worker. This connector means provides pre-positioning of the drive-connector and correct position of the panel-connector in relation to the drive-connector without any visual feedback. Adjustment of the window panel in the motor vehicle is difficult with this connector means.

The German public open document DE 28 36 038 A1 discloses another connector for attaching a window panel to a drive element in a window-lift device. This connector includes a panel-connector with a glass-channel and a tongue-like connector piece insertable into a feeding opening of the drive-connector. The drive-connector includes declining catching planes for guiding the connector piece toward a deflectable locking portion. The deflectable locking portion of the drive-connector snaps into a catching hole of the tongue-like connector piece of the panel-connector to interconnect the panel-connector to the drive-connector. The connector piece disclosed requires exact positioning of the panel-connector to find the locking position. Exact positioning is difficult to achieve without visual feedback. Adjustment of the window panel after its connection to the window panel drive is hard to achieve with this type of connector means.

The German laid open document 196 53 046 A1 (corresponding to U.S. Pat. No. 6,205,711B1) discloses a connector for attaching a window panel to a drive element of a window-lift device. The connector includes a panel-connector with a glass-channel and a tongue-like connector piece. The connector piece includes a protrusion and the drive-connector includes declining catching planes for the protrusion with a horizontally extending channel at the lower end of the declining catching planes. The horizontally extending channel receives the protrusion and is used as a locking device allowing horizontal movement of the panel-connector relative to the drive-connector. A snap locking device between the panel-connector and the drive-connector allows one-way movement for finding the final position of the window panel. While this connector allows some adjustment of the window panel after being connected to the drive element, adjustment is possible in one direction and it is not possible to return to a former position. Further, this prior art connector provides for blind assembling however, some skill is required to find the connecting position. This type of connector is intended for use in particular applications where the window panel can be moved within a final plane when the window is placed in the right or left side of the vehicle.

All prior art examples referred to here-above utilize tool-less assembling and connecting and do not provide release or adjustment of the window panel in both horizontal directions.

The WO document 00/03111 discloses a releasable connector for attaching a window panel to a drive element in a window-lift device for motor vehicles. This connector does not include a panel-connector but only a hole drilled in a lower rim of the window panel to receive a nut and screw. This connector requires visual feedback to the worker to find the exact positions of the holes in the window glass and does not allow for lateral adjustment of the window panel.

IN THE SUMMARY OF THE INVENTION

An object of this invention is to simplify assembly of the window panel to the window-lift device, and, particularly for assembly of a window panel to a window lift device for applications where observation of such assembly is difficult or impossible.

Another object of this invention is to provide for adjustment of the window panel after being assembled to the window-lift device without other parts separate from the connector means. Yet another object of the invention is to provide for connector in a window regulator for attaching the window panel to the drive element which is both simple to manufacture and robust.

The present invention is a window-lift device for a motor vehicle including a connector for attaching a window panel to a drive element. The connector includes a panel-connector having a glass-channel and a tongue-like connector piece. A drive-connector is attachable to the drive mechanism of the window-lift device for lifting and lowering the window panel. Matching fixing pieces releasably fix the panel-connector to the drive-connector. An assembly piece is mounted to the drive-connector and supports a first fixing piece in a pre-assembly position. The assembly piece and the drive-connector together provide a feeding opening for the panel-connector for finding an aligned position in which the fixing pieces may be activated to fix the panel-connector to the drive-connector.

The assembly piece is mountable to the drive-connector and supports the first fixing piece and provides a feeding opening for the panel-connector. The feeding opening aligns the panel-connector in a final fixing position. The fixing pieces provide for subsequent adjustment of the lateral window panel position. A further advantage is provided by the simple construction of each part, such that no complicated molded panel-connector and drive-connector are necessary. Instead, very strong and easy to produce panel-connectors and drive-connectors can be fabricated using an extruded or continuous casted metal profile which can be cut to the length needed for a particular window situation.

The assembly piece may be made from an extruded profile, or as a very simple molded plastic part made from recycling material. Low cost manufacturing process are preferably because, after assembly has taken place and the drive-connector and the panel-connector are fixed together by the matching fixing pieces, the assembly piece has no further function and forms a "lost part".

A second fixing piece is attached to the panel-connector and guided by the assembly piece when feeding the window panel with the panel-connector to the drive-connector to automatically find an aligned position with the first fixing piece. The assembly piece provides for complete "blind" assembly and alignment of the fixing position.

The assembly piece is movably mounted to the drive-connector, such as by being guided along a structure on the drive-connector. This provides for adjustment of the window panel to a final position using only the connector. Adjustment is provided for by pre-fixing the two fixing pieces such that the panel-connector and the drive-connector can be moved relative to each other to find the desired window panel position. Then one fixes the panel-connector to the drive-connector by the matching fixing pieces.

IN THE BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

IN THE DETAILED DESCRIPTION

Figure 1:
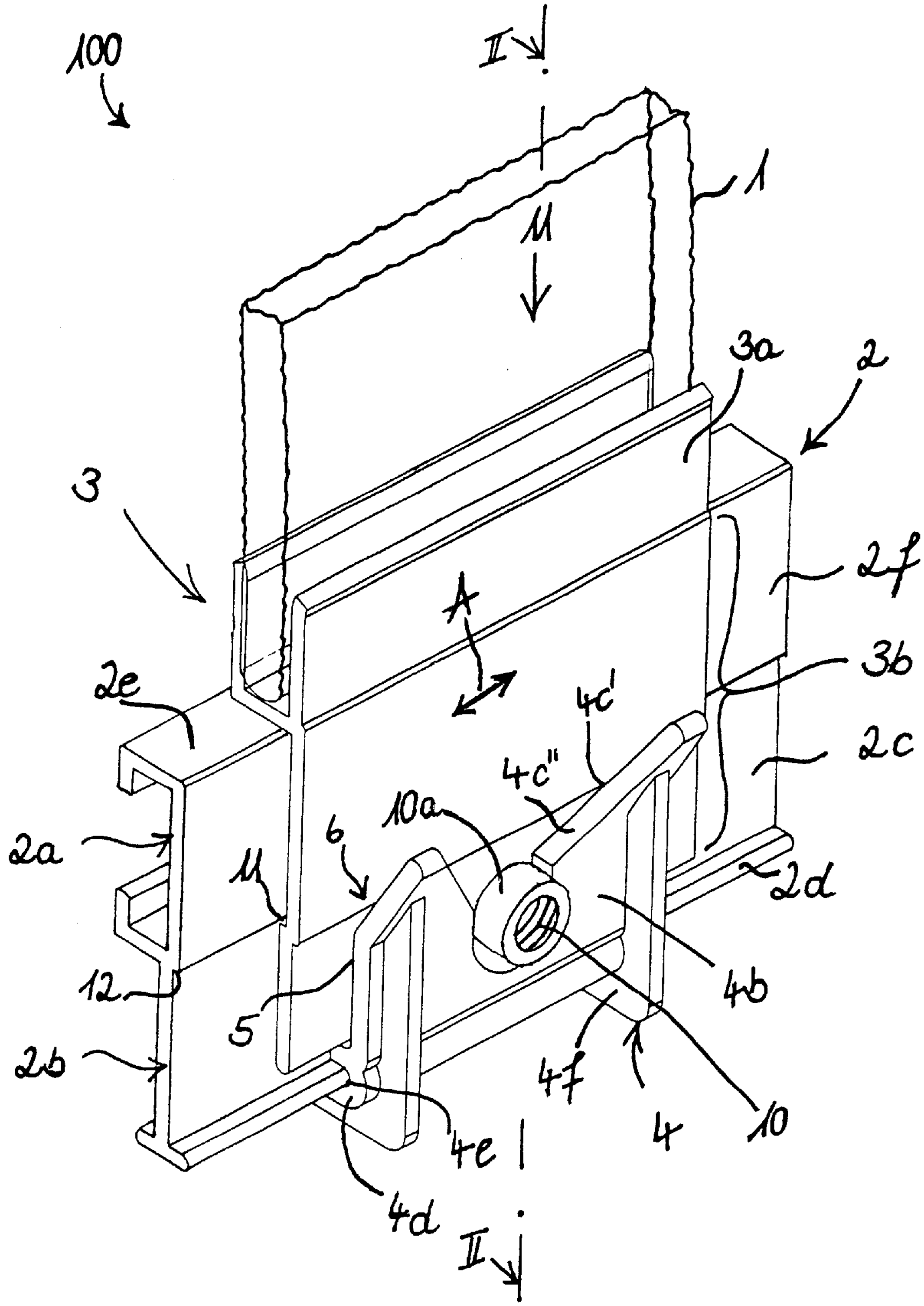
FIG. 1 is a perspective view of a connector means for attaching a window panel to a drive element in a window-lift device for motor vehicles.

Referring to FIGS. 1 to 4 and 6, a connector means 100 of the subject invention includes a panel-connector 3, a drive-connector 2, an assembly clip 4 and a pair of fixing pieces 8 and 10.

The panel-connector 3 has a shape generally known from German laid open document DE 28 36 038 A1 mentioned above.The panel connector includes a glass-channel 3*a* forming a U-shaped cross section to receive a lower edge of a window panel 1. The panel connector 3 receives the lower edge of the window panel 1 between the two U-flanges and the edge of the window panel 1 normally abuts a bottom of the glass-channel. A tongue-like connector piece 3*b* extends from one of the two flanges of the glass-channel 3*a*. The tongue-like connector piece 3*b* includes a step-like portion 11 acting as a blocking element for receiving the drive-connector 2 in a blocking manner in which upwardly and downwardly directed forces on either the panel-connector 3 or the drive-connector 2 are transmitted without loading any force to the matching fixing pieces 8,10. The step-like portion 11 forms a step in parallel to the glass-channel 3*a*. The panel-connector 3 includes the second fixing piece. The second fixing piece is a screw nut 10 fixed to the lower part of the tongue-like connector piece 3*b*. The screw nut 10 is located below the step-like portion 11 and fixed in alignment with a hole 13 through the lower portion of the tongue-like connector piece 3*b*, for instance by a press fit. However, it is obvious to any person skilled in the art, that the second fixing piece can be integrally included to the panel-connector 3, if the second fixing piece has threads for receiving a screw. The hole 13 can have a screw thread. However, the screw nut shown in the embodiment is fixed to the panel-connector and has the advantage of allowing the choice of a material which may be different from the material of the panel-connector 3 and also has further advantages which will become clear.

The drive-connector 2 consists of a C-shaped profile 2*a* and a fixing profile 2*b* suspending therefrom and extending parallel to and downward from the back portion 2*f* of the C-shaped profile 2*a*. At the transition from the C-shaped profile 2*a* to the fixing profile 2*b*, a step-like portion 12 provides a blocking element in connection with the step-like portion 11 of the panel-connector 3. To improve the blocking function, the outer shape of the C-shaped profile 2*a* matches with the outside shape of the upper part of the tongue-like connector piece 3*b* including the step-like portion 11 and the lower end of the glass-channel 3*a* so that the C-shaped profile 2*a* can be received in a recess formed by the outside bottom surface of the glass-channel 3*a*. The outside surface of back portion 2*f* abuts against the upper portion of the tongue-like connector piece 3*b* and the step-like portion 12 abuts against the step-like portion 11 of the panel-connector. All surfaces are flat and abut flat surfaces of another part. The fixing profile 2*b* of the drive-connector 2 abuts against the lower portion of the tongue-like connector piece 3*b* which extends beyond the corresponding blocking element in the form of the step-like portions 11 and 12 respectively. The fixing profile 2*b* contains at least one hole 9 for receiving the first fixing piece 8 in an aligned position to the second fixing piece 10. The size of the hole 9 provides for some lateral play of the fixing piece so that the final relative position between the drive-connector and the panel-connector may be adjusted with respect to each other. Lateral play is selected large enough on each side of a centered position to provide more adjustment space for the window panel 1. This can be reached as an example, if hole 9 is shaped as an oblong hole as indicated in dashed lines as an alternative. Allowing adjustment movement of the drive-connector 2 with respect to the panel-connector 3 is depicted by double arrows A in FIGS. 1 and 4 and will be explained in more detail.

The fixing profile 2*b* of the drive-connector further includes an inverted T-shaped flange or rail portion 2*d* at its lower edge for receiving and mounting the assembly clip.

It should be noted that the panel-connector 3 and the drive-connector 2 preferably are cut from elongated shaped profiles which may be made of any suitable material but preferably of metal profiles. For example, aluminum or aluminum alloys which may be shaped by well known extruding or continuous casting processes can be used. This has three major advantages. First, production is very simple and only a few machining actions are necessary, as an example cutting to length and cutting holes or recesses and, eventually, press fixing a screw nut aligned with the hole 13 in the panel-connector 3. The second advantage of the overall shape of the drive-connector 2 and the panel-connector 3 lies in the ability to transfer considerable forces between both of the rails. Due to the shape and material selection, the profiles are strong enough to transfer forces without loading the fixing pieces. The third advantage of the overall shape of the panel-connector 2 and the drive-connector 3 is that they can be moved parallel to the window pane 1 relative to each other in a guided manner. This movement provides for lateral adjustment of the window panel 1 before screwing down the matching fixing pieces. This overall structure also provides for the use of the same profiles for different window shapes and also for locating the connector in any pre-determined location along the lower edge portion of the window panel. Further, the overall shape of the drive-connector is advantageous when used in connection with various kinds of window regulator types. The C-shaped profile 2*a* may be used for receiving a roller or a link block of a window regulator arm in a rolling or sliding manner. Finally, the overall shape of the drive-connector provides for receiving the assembly clip in a moveable guided manner.

Figure 5:
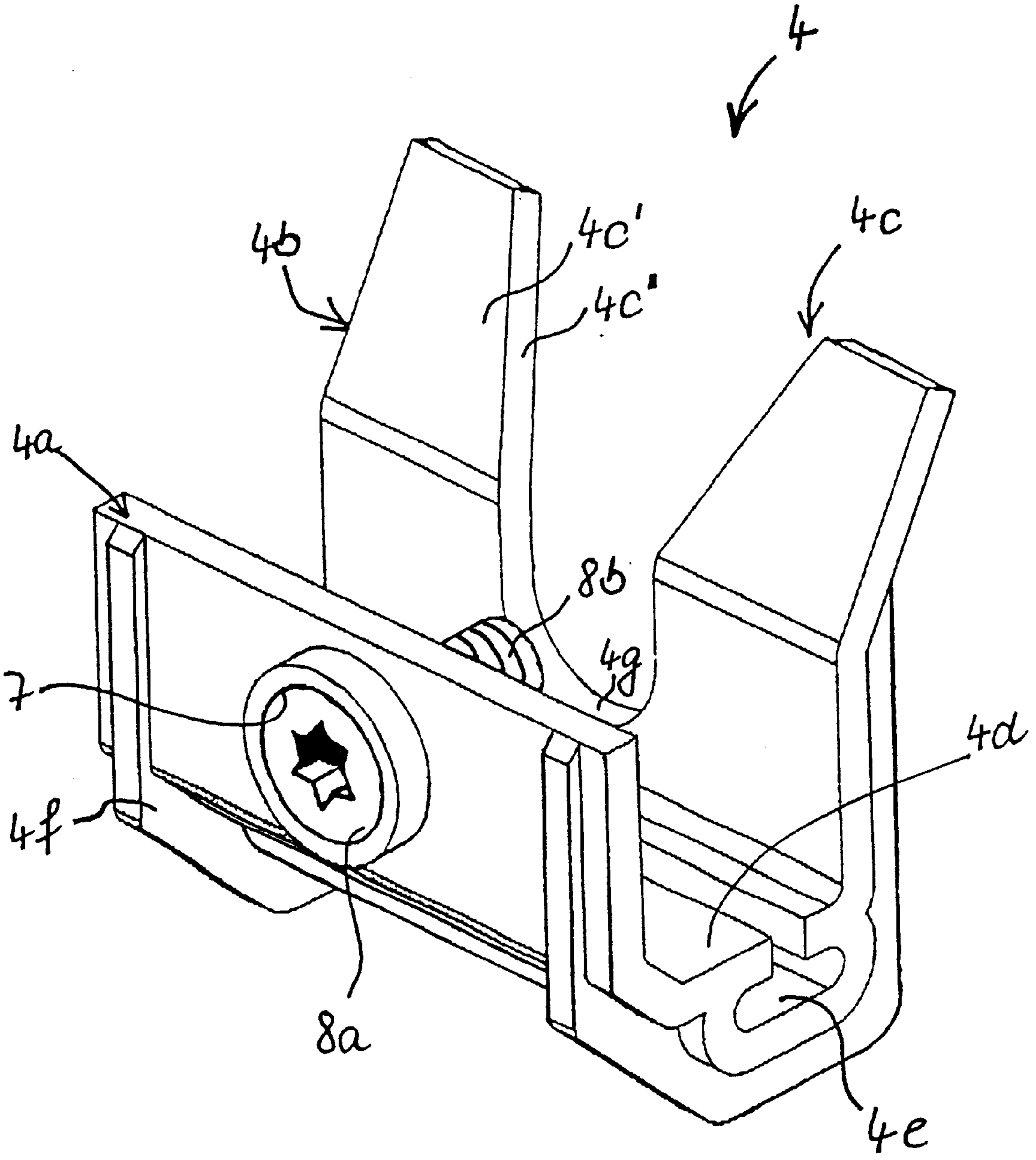
FIG. 5 is a perspective view of an assembly piece (assembly clip) with a fixing screw held in a pre-assembled position.
Figure 6B:
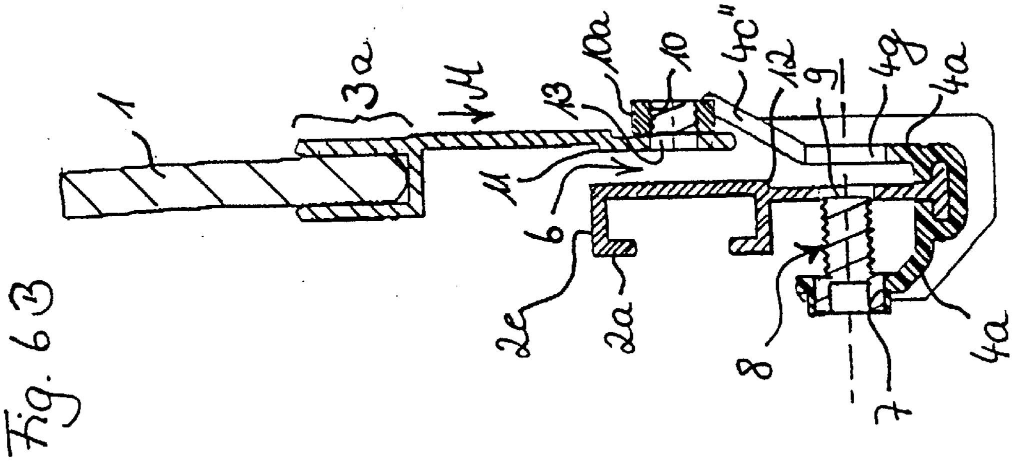
FIG. 6B is a sectional view along line VIB—VIB as shown in FIG. 6A.
Figure 6A:
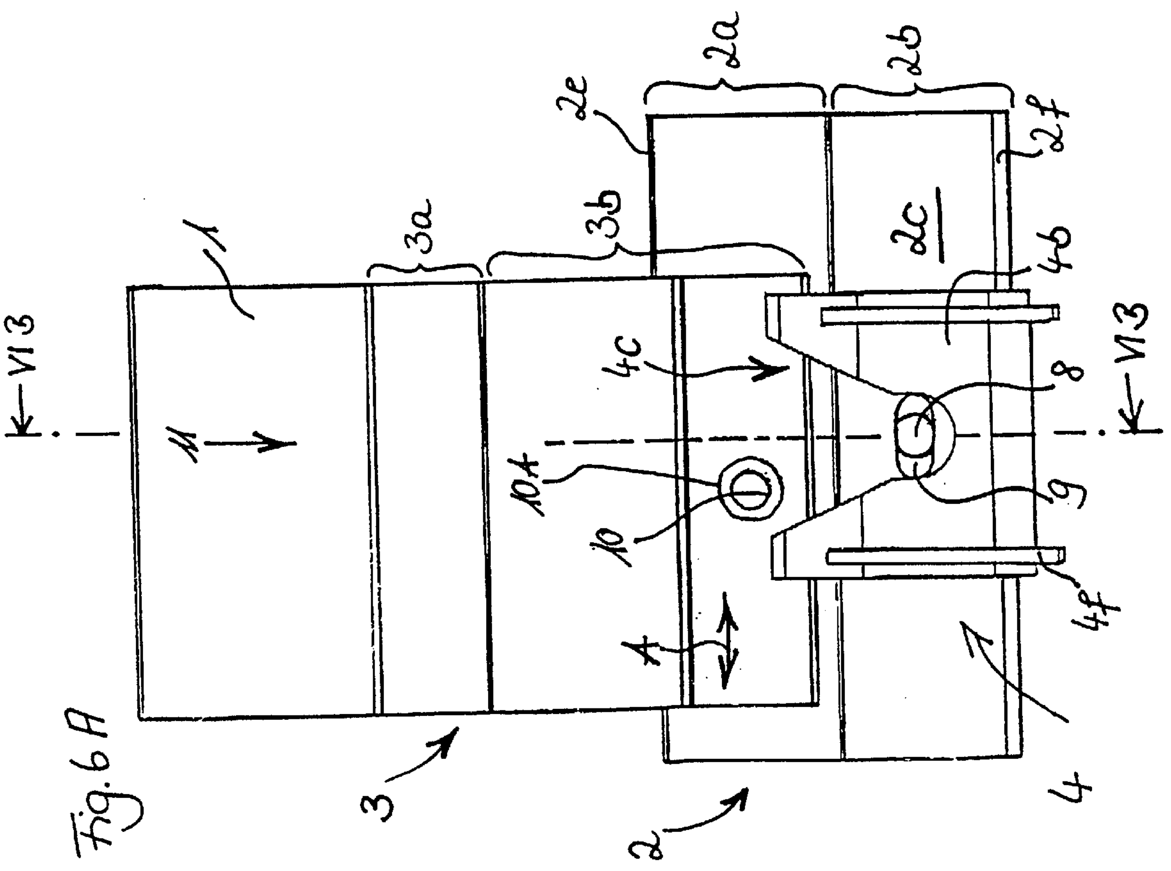
FIG. 6A is a side elevation of the connector from outside the vehicle.

Referring to the Figures and particularly to FIG. 5, the assembly clip 4 can have a complex shape, but can easily be made by a common plastic injection molding process. However, it should be noted, that the assembly clip 4 may be manufactured in an extruded or continuous casting process as well and cut into lengths and machined thereafter for receiving the matching fixing pieces in an aligned manner. The assembly clip is an assembly aid with no considerable function after assembly of the connector means and adjustment and fixing of the panel-connector 2 to the drive-connector 3.

The assembly clip 4 is generally U-shaped and includes first and second flange portions 4*a* and 4*b* and a relatively wide bottom portion 4*d* therebetween. The bottom portion 4*d* has a grooved recess 4*e* accessible from the inside bottom and extending along the whole length of the assembly clip 4 at a right angle to the U-shape cross section of the assembly clip 4. The assembly clip 4 includes reinforcing fins 4*f* to strengthen the assembly clip 4 while allowing thin material dimensions to be used.

In the middle of the first flange portion 4*a,* is a pre assembly portion for receiving and carrying the first fixing piece. In the illustrated embodiment, a collar around a circular hole 7 provides for the support of the cylindrical head 8*a* of a fixing screw in a slightly clamping manner. This clamping holds the fixing screw 8 in a pre-assembled aligned manner without losing the fixing screw 8, during pre-assembly handling of the assembly clip 4. The collar is spaced a lateral distance from the drive-connector 2 to provide for receiving a threaded bolt portion.

The second flange portion 4*b* includes declining catching planes 4*c* around a position 4*g* opposite to the circular hole 7 in the first flange portion 4*a*. The declining catching planes are symmetrically placed on each side of the aligning location of fixing screw 8. Each of the two declining catching planes 4*c* include sub-planes 4*c*' and 4*c*". The sub-planes 4*c*' extend upward and outside from the second flange portion 4*b*. The sub-planes 4*c*" form a V-shaped recess in the second flange portion 4*b* starting from its upper edge to decline to the aligning portion 4*g* of the matching fixing pieces within the second flange portion 4*b* of the assembly clip 4.

Referring to FIGS. 1–6, operation of the connector begins by mounting the assembly clip 4 with the first fixing piece 8 to the drive-connector 2. One pushes the grooved recess 4*e* of the mounting clip over the rail portion 4*d* of the drive-connector. The shape of the rail portion 4*d* matches with the grooved recess 4*e* to receive the assembly clip 4 in a guided slidable manner. During this action, the threaded bolt portion 8*b* of fixing screw 8 ends at small distance before one of the opposing surfaces of the fixing profile 2*b* which provides for the assembly clip 4 to be pushed on to and slid along the drive-connector 2 without obstruction.

When the assembly clip 4 has reached the alignment area of the drive-connector 2, the hole 9 in fixing profile 2*b* of the drive-connector 2 will be in alignment with threaded bolt portion 8*b* of screw 8. Pushing the screw 8 forward causes the threaded bolt portion 8*b* to enter the hole 9. The assembly clip 4 becomes relatively fixed along the drive-connector 2 except for lateral movement allowed by play between the threaded bolt portion 8*b* and hole 9 in the sliding direction of rail portion 2*d* and grooved recess 4*e*. This position is best shown in FIGS. 5B and 2.

The drive-connector 2 is now ready for receiving the panel-connector 3. However, this assembly action is effected only after the drive-connector 2 has been assembled to the window regulator. The whole window regulator and drive-connector 2 will be assembled with the vehicle door or a body portion of the vehicle, eventually and preferably using a module as is known.

When inserting the window panel 1 through a window panel slit in the lower edge of a window opening of the vehicle (not shown), the panel-connector 3 will automatically approach the overall position of the drive-connector 2. As shown in FIGS. 5A and 5B, it is not necessary to exactly meet the aligning position at once because the panel-connector 3 will find its way to the aligned position automatically even if the panel-connector 3 approaches the drive-connector 2 horizontally offset in two directions. This alignment is possible first by a feeding opening 6 formed between the outer surface of the drive-connector 2 and the inner surface of the second flange portion 4*b* of the mounting clip 4. The declining catching planes 4*c* will support the tongue-like connector piece 3*b* of the channel-connector 3 to find an aligned position. First, sub-planes 4*c*' guide the lower edge of the tongue-like connector piece 3*b* toward a final position close to the outer surface of the drive-connector so that the inner surface of the panel-connector 3 will approach and close the lateral gap between the drive-connector 2 and panel-connector 3 as the panel-connector 3 approaches the final position. The second sub-planes 4*c*" will catch the protrusion 10A at the lower portion of the tongue-like connector piece 3*b* of the panel-connector 3 at the outer circumference of the screw nut 10 forming the second fixing piece. This catching action itself is known from German laid open document 196 53 046 A1 as described above.

Figure 2:
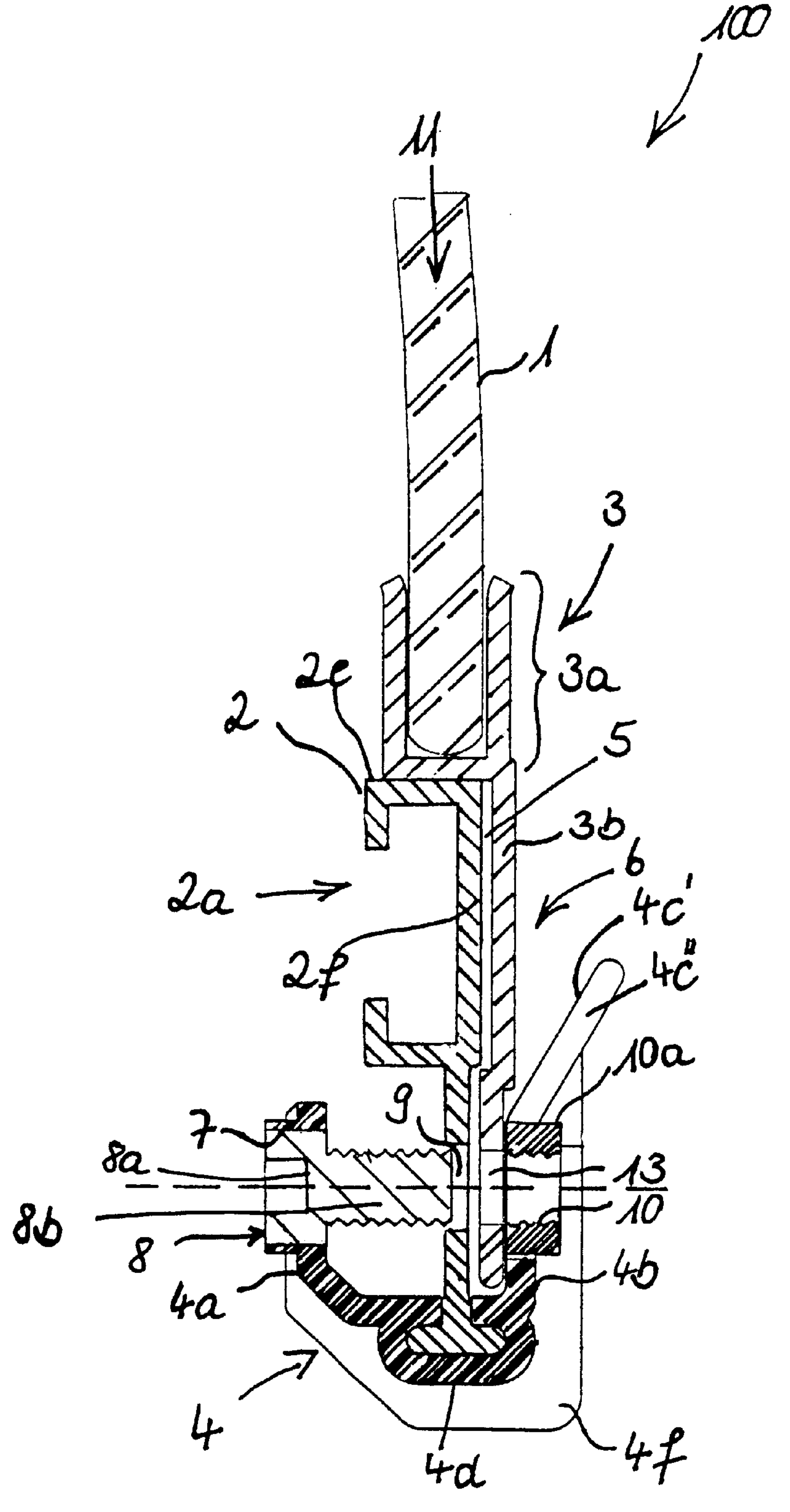
FIG. 2 is a sectional view of the connector means in its pre-fixed position along line II—II.

At the end of the position finding action, the outer bottom surface of glass-channel 3*a* will abut the outer surface of the upper flange portion 2_e_ of the drive-connector 2 as shown in FIG. 2. The opposing side surfaces of the tongue-like connector piece 3_b_ and the drive-connector 2 will still be apart from each other due to the matching portions 12 and 11 as shown in FIG. 2. The drive-connector 2 and panel-connector. connector 3 are in the aligned position, as the second fixing piece has found its alignment position within aligning portion 4_g_ of the assembly clip 4 and screw 8 may be drilled from inside the vehicle through an aligned hole in the module sheet which may be closed in water tight manner later.

Figure 3:
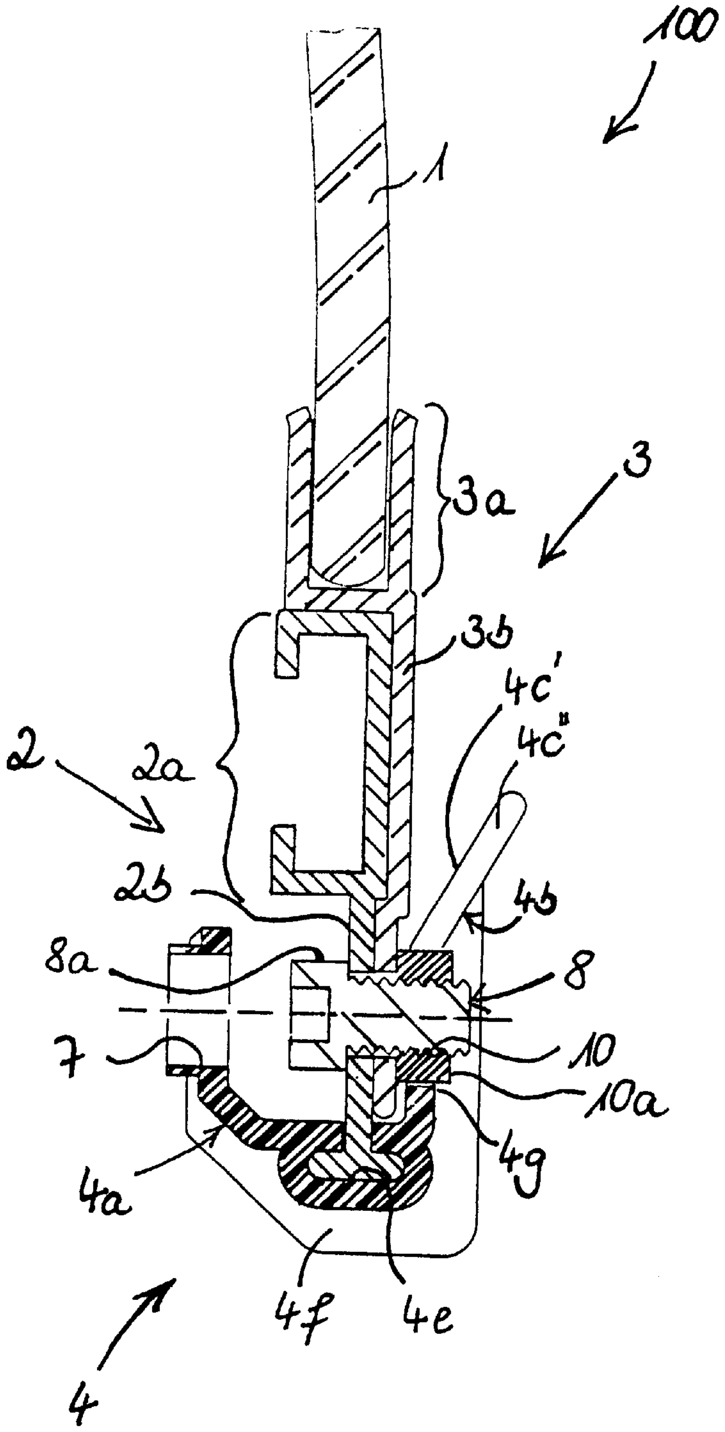
FIG. 3 is a sectional view along line II—II with the connector means in an engaged position.
Figure 4:
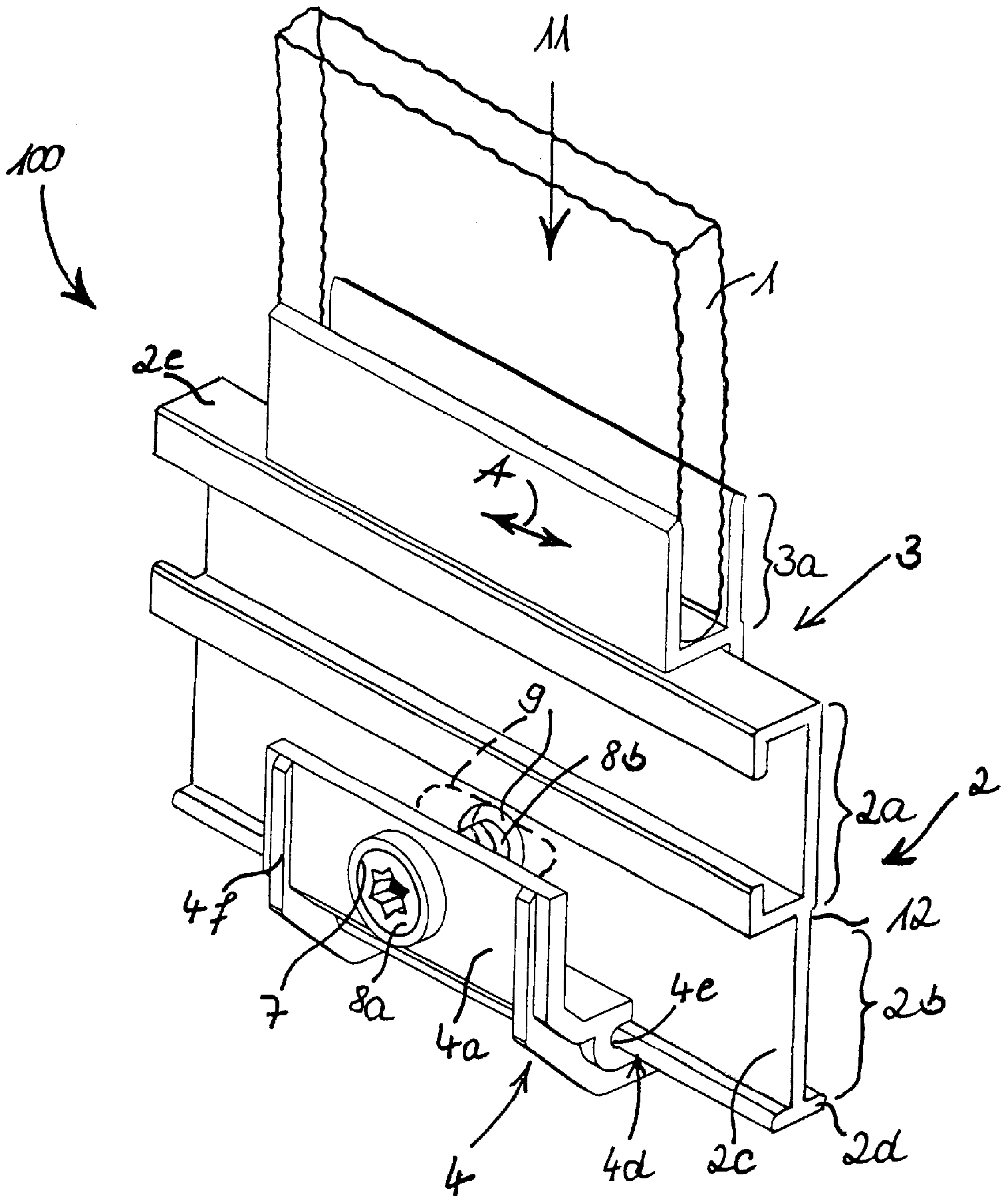
FIG. 4 is a perspective view of the window panel shown in its pre-fixed position before the final fixing position is reached.

Shortly before screw 8 reaches its final fixing position, as is shown in FIG. 3, the panel-connector 3 and the drive-connector 2 approach each other to close the lateral gap due to actuation of the first and second matching fixing pieces (screw 8 and thread 10), to bring a C-shaped profile 2_a_ of drive-connector 2 into its matching position within the recess formed in panel-connector 3 such that the matching step-like portions 11 and 12 abut each other.

Before screw 8 is tightened, there is still some movement possible between the panel-connector 3 and the drive-connector 2 in a direction to adjust the window panel 1. It is to be noted, that in this phase of the assembly action, the assembly clip 4 has terminated its function and forms a lost part which is held by rail portion 2_d_ of the drive-connector 2. In this phase, even the first and second matching fixing pieces only have the function of applying some pressing force between drive-connector 2 and panel-connector 3. However, any vertical forces (in Z-direction) and horizontal forces (in X-direction) are transferred between the matching portions of the drive and panel-connectors.

When the final adjustment position has been obtained, screw 8 is tightened for fixing the adjustment position. Obviously, the actions mentioned before may be reversed, for instance for removing the window panel or eventual future adjustment actions if necessary.

The foregoing description is exemplary and nut just a material specification. The invention has been described in an illustrative manner, and should be understood that the terminology used is intended to be in the nature of words of description rather than limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed:

1. A window-lift assembly comprising:

a panel connector to be connected to a window panel;

a drive connector supporting said panel connector;

a generally U-shaped assembly piece movably mounted to said drive connector; and first and second fixing pieces, said first fixing piece mounted on said assembly piece in a pre-assembly position, and said second fixing piece is mounted on said panel connector in said pre-assembly position, wherein said pre-assembly position comprises said first and second fixing pieces supported a distance apart from each other, said first and second fixing pieces movable from said pre-assembly position to an engaged position where one of said first and second fixing piece is received within another of said first and second fixing pieces for securing said panel connector to said drive connector.

2. The window-lift assembly as recited in claim 1, wherein said drive connector comprises a rail and said assembly piece includes a groove for slidably mounting said assembly piece to said rail of said drive connector.

3. The window-lift assembly as recited in claim 1, wherein said first fixing piece is a threaded bolt comprising a head portion and a threaded rod portion, and said assembly piece comprises a first flange, said head portion supported on said first flange in said pre-assembly position.

4. The window-lift assembly as recited in claim 3, wherein said drive connector comprises an opening for said first fixing piece and said first flange supports said head portion a lateral distance from said drive connector such that said threaded rod portion is adjacent said opening when in said pre-assembly position.

5. The window-lift assembly as recited in claim 3, wherein said assembly piece further comprises a second flange defining a guide slot for guiding said panel connector into alignment with said drive connector.

6. The window-lift assembly as recited in claim 5, wherein said second flange piece further comprises declining planes for directing said panel connector toward an aligned position in which said first and second fixing pieces are aligned for engagement to secure said drive connector to said panel connector.

7. The window-lift assembly as recited in claim 1, wherein said drive connector and said panel connector further comprise mating alignment surfaces.

8. The window-lift assembly as recited in claim 7, wherein said mating alignment surface of said drive connector comprises part of a C-shaped portion of said drive connector.

9. The window-lift assembly as recited in claim 1, wherein said assembly piece is a plastic molded part.

10. The window-lift assembly as recited in claim 1, wherein said panel connector and said drive connector are each extruded in a continuous profile and cut to a desired length.

11. The window-lift assembly as recited in claim 1, wherein said panel connector and said drive connector are each cast as a continuous profile and cut to a desired length.

12. The window-lift assembly as recited in claim 1, wherein said assembly piece comprises first and second flanges defining a space therebetween, said first fixing piece supported in said pre-assembly position spaced apart from said second flange so as to define a portion of said space for insertion of said panel connector.

13. The window-lift assembly as recited in claim 12, wherein said second flange of said assembly piece guides a portion of said panel connector to align said second fixing piece with said first fixing piece.

14. A connector assembly for a window lift device comprising:

a panel connector to be attached to a window panel;

a drive connector movably mounted with respect to said panel connector;

a generally U-shaped assembly piece movably mounted to said drive connector; and first and second fixing pieces, said first fixing piece mounted on said assembly piece in a pre-assembly position, and said second fixing piece mounted on said panel connector in said pre-assembly position, wherein said pre-assembly position comprises said first and second fixing pieces supported a distance apart from each other, said first and second fixing pieces movable from said pre-assembly position to an engaged position where one of said first and second fixing pieces is received in another of said first and second fixing pieces for securing said panel connector to said drive connector.

15. The connector assembly as recited in claim 14, wherein said drive connector comprises a rail and said assembly piece comprises a groove matching said rail, said assembly piece slidably mountable to said rail of said drive connector.

16. The connector assembly as recited in claim 14, wherein said first fixing piece is a threaded bolt comprising a head portion and a threaded rod portion, and said assembly piece comprises a first flange, said head portion supported on said first flange in said pre-assembly position.

17. The connector assembly as recited in claim 16, wherein said assembly piece further comprises a second flange defining a guide slot for guiding said panel connector into alignment with said drive connector.

18. The connector assembly as recited in claim 14, wherein said drive connector and said panel connector further comprise mating alignment surfaces.

19. A window-lift assembly comprising:

first and second fixing pieces;

a panel connector to be connected to a window panel, said second fixing piece mounted on said panel connector;

a drive connector comprising a rail and supporting said panel connector; and an assembly piece including a groove slidably mounting said assembly piece to said rail of said drive connector, said first timing piece mounted on a first flange of said assembly piece in a pre-assembly position, wherein said pre-assembly position comprises said first fixing piece spaced a distance apart from a second flange of said assembly piece, and said second flange vertically and horizontally guiding said second fixing piece into an aligned position with said first fixing piece.

20. The window-lift assembly as recited in claim 19, wherein said first fixing piece is a threaded bolt comprising a head portion and a threaded rod portion and said head portion mounted on said first flange in said pre-assembly position such that said threaded rod portion is a distance from said drive connector when in said pre-assembly position.

21. The window-lift assembly as recited in claim 19, wherein said second flange further comprises declining planes for directing said panel connector toward a position so as to move said first and second fixing pieces into said aligned position.

22. The window-lift assembly as recited in claim 19, wherein said drive connector and said panel connector further comprise mating alignment surfaces.

23. The window-lift assembly as recited in claim 19, wherein said rail is T-shaped and said groove in said assembly piece is a T-shaped channel.

24. The window-lift assembly as recited in claim 23, wherein said assembly piece comprises a U-shape for receiving said panel connector.

* * * * *

UNITED STATES PATENT AND TRADEMARK OFFICE

CERTIFICATE OF CORRECTION

PATENT NO. : 6,729,073 B2
DATED : May 4, 2004
INVENTOR(S) : Nicolai

It is certified that error appears in the above-identified patent and that said Letters Patent is hereby corrected as shown below:

Title page,
Item [75], Inventor, the inventor's residence should read as -- Grosskotzenburg (DE) --

Column 8,
Line 21, delete "piece"

Column 9,
Line 29, "timing" should read as -- fixing --

Signed and Sealed this

Tenth Day of August, 2004

JON W. DUDAS
*Acting Director of the United States Patent and Trademark Office*